United States Patent

Akai et al.

[11] Patent Number: 6,005,183
[45] Date of Patent: Dec. 21, 1999

[54] DEVICE CONTAINING SOLAR CELL PANEL AND STORAGE BATTERY

[75] Inventors: Yuichi Akai, Kanagawa-ken; Naoaki Ogure, Tokyo; Yutaka Wada, Kanagawa-ken, all of Japan

[73] Assignee: Ebara Corporation, Tokyo, Japan

[21] Appl. No.: 08/771,765

[22] Filed: Dec. 20, 1996

[30] Foreign Application Priority Data

Dec. 20, 1995 [JP] Japan .................................. 7-349251

[51] Int. Cl.$^6$ .............................. H01L 31/02; H01M 6/30
[52] U.S. Cl. .................... 136/244; 136/291; 136/293; 429/111; 320/101
[58] Field of Search ..................... 136/244, 251, 136/259; 429/51, 107, 109, 111, 160, 152, 158, 156, 157, 161, 162

[56] References Cited

U.S. PATENT DOCUMENTS

| | | | |
|---|---|---|---|
| 3,094,439 | 6/1963 | Mann et al. | 136/244 |
| 3,996,064 | 12/1976 | Thaller | 320/2 |
| 4,085,257 | 4/1978 | Witzke | 429/111 |
| 4,481,265 | 11/1984 | Ezawa et al. | 429/9 |
| 4,481,562 | 11/1984 | Hickson | 362/183 |
| 4,718,185 | 1/1988 | Conlin et al. | 40/442 |
| 4,786,567 | 11/1988 | Skyllas-Kazacos et al. | 429/19 |
| 4,797,566 | 1/1989 | Nozaki et al. | 307/43 |
| 5,602,457 | 2/1997 | Anderson et al. | 320/2 |

FOREIGN PATENT DOCUMENTS 1-213964  8/1989  Japan .

*Primary Examiner*—Nam Nguyen
*Assistant Examiner*—Michael C. Miggins
*Attorney, Agent, or Firm*—Nikaido, Marmelstein, Murray & Oram LLP

[57] ABSTRACT

A device is provided which comprises a solar cell section formed in a plate and a storage battery section. The solar cell section includes one or more solar cells which generate electrical power when they receive light. The storage battery section is lying under the solar cell section and comprises one or more storage battery cells separated by bulkheads. Each of the storage battery cells comprises two chambers containing electrolytic solutions and a membrane dividing the chambers, whereby ions solved in the solutions undergo a change in valences, while maintaining their status as solved ions. Holes are extending through the bulkheads to exchange the electrolytic solutions in the storage battery cells, thereby the concentration of the cells can be maintained to be substantially uniform.

13 Claims, 2 Drawing Sheets

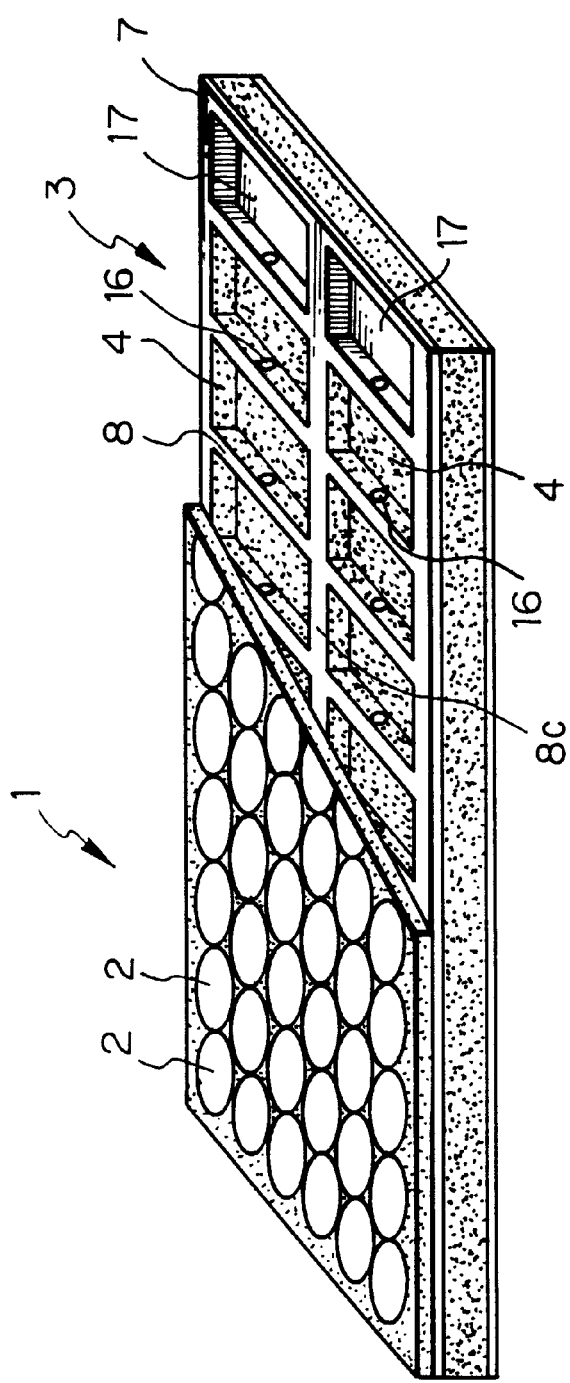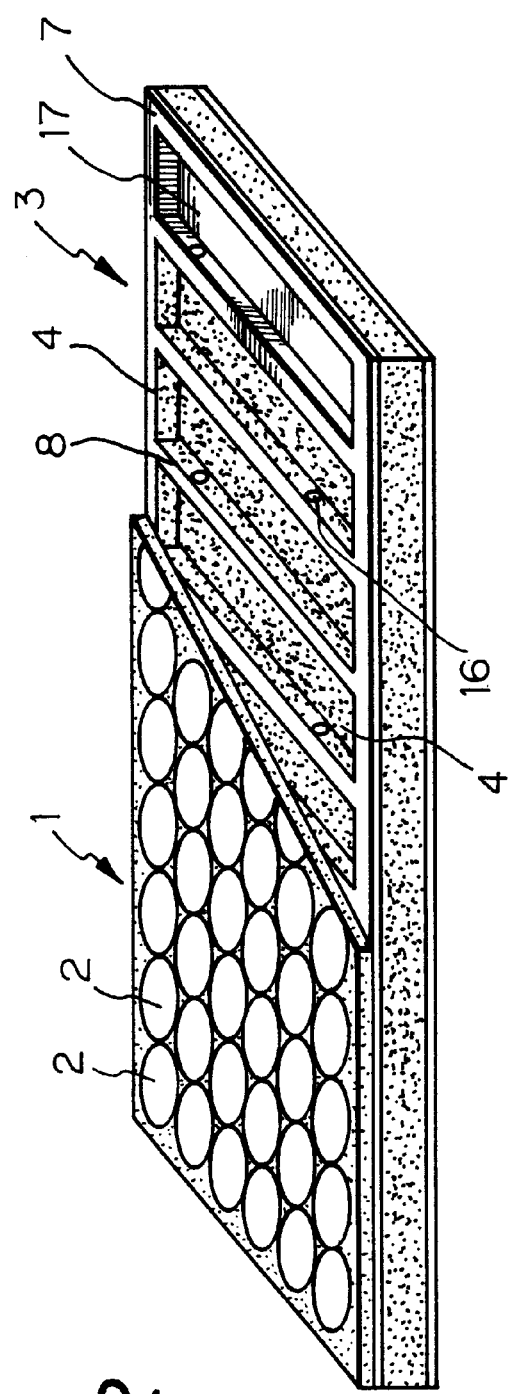

6,005,183

DEVICE CONTAINING SOLAR CELL PANEL AND STORAGE BATTERY

BACKGROUND OF THE INVENTION

The present invention relates to a device containing a solar cell panel and a storage battery integrally, which is preferable as an electronic power supply or source for facilities in remote places, mobile station and so on.

Solar cell panels are widely used in view of their energy efficiency and non-maintenance. A maintenance-free power source is particularly useful in remote places.

However, not only a silicone solar cell panel (such as a single crystal silicone solar cell panel, a polycrystal silicone solar cell panel, or an amorphous silicone solar cell panel) but also a thin film solar cell panel (such as a gallium arsenide thin film solar cell panel) can generate electricity only when it receives light such as solar light and so on, and it cannot generate any power at nighttime and under cloudy or rainy conditions even if it is daytime, power generation is remarkably reduced.

Consequently, in a case where a conventional power supply (or system power supply) is provided through distribution lines or cables, a solar cell panel and the conventional power supply are used in parallel, and when an output voltage from the solar cell panel falls below a predetermined level, the power from the conventional power supply is provided to a load. Obviously, however, this method requires power distribution means (or power distribution cables) and thus it is impossible to be employed in a case where there is no distribution means of a conventional power supply. Further, a conventional power supply usually provides an AC voltage, while a solar cell panel provides a DC voltage. Therefore, a converter and/or an inverter is required to convert the AC or DC voltage output from the conventional power supply or solar cell panel to an appropriate current, or a DC or AC voltage to be applied to a load, even if the load is an AC load or a DC load.

Furthermore, in a case where there is a great discrepancy between a time period during which a solar cell panel can generate and charge electrical power and a time period during which a load power is consumed, there is little advantage in using a solar cell panel in order to supplement the capability of power generation. For example, when a load is an air cooling system which is usually used in summer time, power generation in a solar battery substantially coincides with power consumption of the air cooling system, and when a load is an air heating system which is usually used at night in winter or a TV receiver which is usually turn-on at night, power generation in a solar cell panel may well not coincide with power consumption of the air heating system or TV. In the former case, there is a great advantage in employing the solar cell panel for electricity requirements, while in the latter case, there is little advantage therein.

Accordingly, if there is no main power supply or conventional power supply is available and power is consumed during period when no light reaches the solar cell panel, a system is employed in which power generated by the solar cell panel is charged to a storage battery.

In this case, however, a place for positioning the storage battery thereat is needed, and when power storage is required on a large scale, a chamber for accommodating the storage battery is needed. In addition, since the solar cell panel is produced separately from the storage battery, it is necessary to properly match the voltages of the solar cell panel and the storage battery, otherwise poor performance results. That is, charging to the storage battery is made impossible, or an operating point of the solar cell panel greatly deviates from the maximum performance point. Therefore, solar cell panel manufacturers, storage battery manufacturers or third party equipment fabricators have to adjust the output voltage of the solar cell panel or storage battery to coincide with the other.

Although a polymer battery, which is a kind of a solar cell panel having a power charging function, has been fabricated, it is still at laboratory level. Neither there has been developed nor put to practical use such a type of solar cell panel having the same power generation capability as that of a silicone solar cell panel.

SUMMARY OF THE INVENTION

The present invention has been made to solve the aforementioned problems inherent in prior solar cell panels, and an object of the present invention is to provide a solar cell panel which can be handled similarly to a prior panel type solar cell panel, and can provide a substantially stable output voltage and a power output in a range from several tens of watts to several kilowatts, and is less influenced by weather variation and so on.

In order to achieve the object of the present invention, a device according to the present invention comprises: (a) a solar cell section having a plate form comprising one or more solar cells which generate electrical power when they receive light; and (b) a storage battery section lying under said solar cell section, comprising one or more storage battery cells.

It is preferable that the device is formed in a plate as a whole, and also comprises an electric circuit for charging electrical power generated by the solar cell section in the storage battery section and for providing electrical power to output terminals of the device. The electric circuit includes first and second pairs of lines formed inside the device wherein the first pair of lines are connected to provide the electrical power from the solar cell section to the output terminals, and the second pair of lines are connected to charge the electrical power from the solar cell section to the storage battery section and to provide the charged electrical power to the output terminals. The first and second pairs of lines are connected to each other prior connecting to the output terminals. The electric circuit further includes a diode for preventing a reverse current flowing through the first pair of lines, which is imposed in one of lines of the first pair.

It is preferable to constitute the storage battery section such that each of the storage battery cells comprises a first chamber containing a first electrolytic solution, a second chamber containing a second electrolytic solution and a membrane dividing the first and second chambers, whereby ions solved in the first and second solutions undergo a change in valences while maintaining their status as solved ions. Preferably, the first solution is a hydrochloric acid solution containing iron ions solved therein and the second solution is a hydrochloric acid solution containing chrome ions solved therein, thereby the valences of the iron ions and chrome ions are changed, as charging or discharging is performed in the storage battery section. Instead of the above solutions, a sulfuric acid solution containing vanadium ions solved therein is also useful as the first and second solutions, thereby the valences of vanadium ions are changed, as charging or discharging is performed in the storage battery section.

It is further preferable to include, in the storage battery section, a first group of solution paths each connecting two adjacent first chambers to each other to communicate the first solution, and a second group of solution paths each connecting two adjacent second chambers to each other to communicate the second solution. Further, it is preferable to form all of the membranes for the storage battery cells as a single common membrane, and to comprise the storage battery section as a multiplicity of layers of storage battery cells.

The solar cells are connected such that they are connected in series for several ones to form serial branches providing substantially the same voltage and the serial branches are connected in parallel, and the number of the solar cells of each of the serial branches is selected so that the voltage provided by the serial branches is substantially the same as that of the storage battery section.

BRIEF DESCRIPTION OF DRAWINGS

FIG. 1 is a partially-cutaway perspective view illustrating an embodiment of a device containing a solar cell panel and a storage battery, according to the present invention;

FIG. 2 is a partially-cutaway perspective view illustrating a second embodiment of a device containing a solar cell panel and a storage battery, according to the present invention;

DESCRIPTION OF THE PREFERRED EMBODIMENTS

Figure 3:
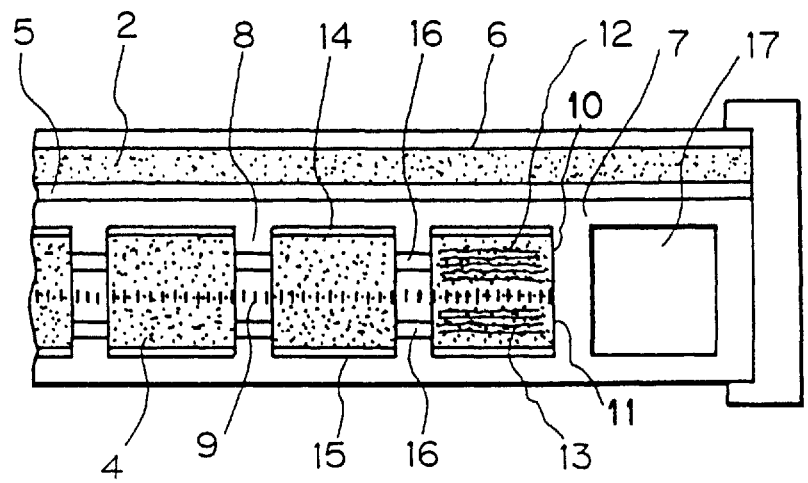
FIG. 3 is a partial sectional view of the embodiment shown in FIG. 1 or 2.

FIGS. 1 and 2 respectively show first and second embodiments of a device incorporating a solar cell panel and a storage battery (or "storage battery built-in solar cell panel") in a partially cutaway view, according to the present invention. FIG. 3 illustrates a partial sectional view of the first or second embodiments.

The embodied device illustrated in FIG. 1 comprises a solar cell section 1 where electrical power is generated and a storage battery section 3 where electrical power is charged. The solar cell section 1 comprises a plurality of solar cells 2 formed from single-crystal silicone, and the storage battery section 3 comprises a plurality of redox (reduction-oxidation) battery cells 4 each employing electrolytic solutions comprising sulfuric acid solutions containing vanadium ions solved therein.

The solar cell section 1 is disposed such that it covers a whole top surface of the storage battery section 3 and is shaped into a rectangular plate. The overall shape and size of the device can be determined according to need of a space to accommodate the device, and it is possible to use any modified shape such as a polygon, circle, curved pattern such as an oval, an L-shape, or doughnut shape. In addition, as long as planarity is maintained on the surface to some extent, any curved surface including spherical and conical forms can be used.

The solar cell 2 is constituted in a disk shape by superimposing a p-type conductive layer on an n-type conductive layer. As shown in FIG. 3, the disc shaped cells 2 are disposed on a carrying or holding plate 5 in a planar fashion, and a light receiving surface is covered with a protection glass 6. The solar cells 2 are electrically connected such that the solar cells are electrically connected in a series of 20–30 to make serial branches each providing an open-circuit voltage (or, a maximum voltage) of about 17 V, for instance, and the serial branches of the solar battery cells 2 are connected to each other in parallel.

The redox battery cells 4 of the storage battery section 3 are disposed in a protection frame 7 made of plastics having anticorrosion and a certain mechanical strength, and this frame 7 is divided by bulkheads 8 so that a necessary number of redox battery cells 4 can be arrayed in a planar fashion. The number of cells 4 is determined depending on a voltage needed for a power supply. In the embodiment shown in FIG. 1, 20 redox battery cells are arranged in two rows to provide an open-circuit voltage of about 17 V.

As shown in FIG. 3, each of the redox battery cells 4 is constructed such that carbon fibre electrodes 12, 13 for impregnating positive and negative electrolytic solutions are accommodated in chambers 10, 11 (or, positive chambers 10 and negative chambers 11), respectively, and are vertically partitioned by an ion exchange membrane 9, with positive and negative collector plates 14, 15 being respectively disposed on a top side each of the positive chambers 10 and a bottom side each of the negative chambers. The positive chambers 10 and the negative chambers 11 are connected to each other in the respective groups via electrolyte exchange holes 16 extending through the bulkheads 8 dividing the respective chambers, whereby the concentration of each of the positive and negative electrolytic solutions in the positive and negative chambers can be maintained to be uniform. The ion exchange membrane 9 is constituted of a large sheet which extends through the bulkheads 8, so that it can be made available, thereby making it possible to reduce the cost of the storage battery section.

It is preferable that the positive electrolytic solution in the positive chamber is a hydrochloric acid solution containing iron ions solved therein and the negative electrolytic solution in the negative chamber is a hydrochloric acid solution containing chrome ions solved therein. In this case, the valences of the iron ions and chrome ions are changed, as charging or discharging is performed in the storage battery section. It is also preferable to employ sulfuric acid solutions containing vanadium ions solved therein as both the positive and negative electrolytic solutions. In the second case, the valences of vanadium ions in the positive and negative chambers are changed, as charging or discharging is performed in the storage battery section.

A pair of extra spaces 17 are provided at an end portion of the protection frame 7. The extra spaces 17 respectively are used as spaces for injecting the electrolytic solution and/or for accommodating an output terminal board, from which power voltage is provided through wires. In this embodiment, there is provided no means for forcibly circulating each of the electrolytic solution to have a uniform concentration. However, it is preferred to install pumps in the spaces to effect a forcible circulation of the electrolytic solutions by using excess electrical power generated by the solar cell section 1.

The second embodiment of the device containing a solar cell panel and a storage battery shown in FIG. 2 has a constitution similar to the first embodiment shown in FIG. 1, with the provision that the center bulkhead 8c, which divides the redox battery cells 4 into two rows (FIG. 1), is not included and thus the cells 4 are arranged in a row. Further, in the second embodiment, the electrolyte exchange holes 16 are formed in alternate positions in order to prevent the stagnation area of electrolytic solution flow.

Figure 4:
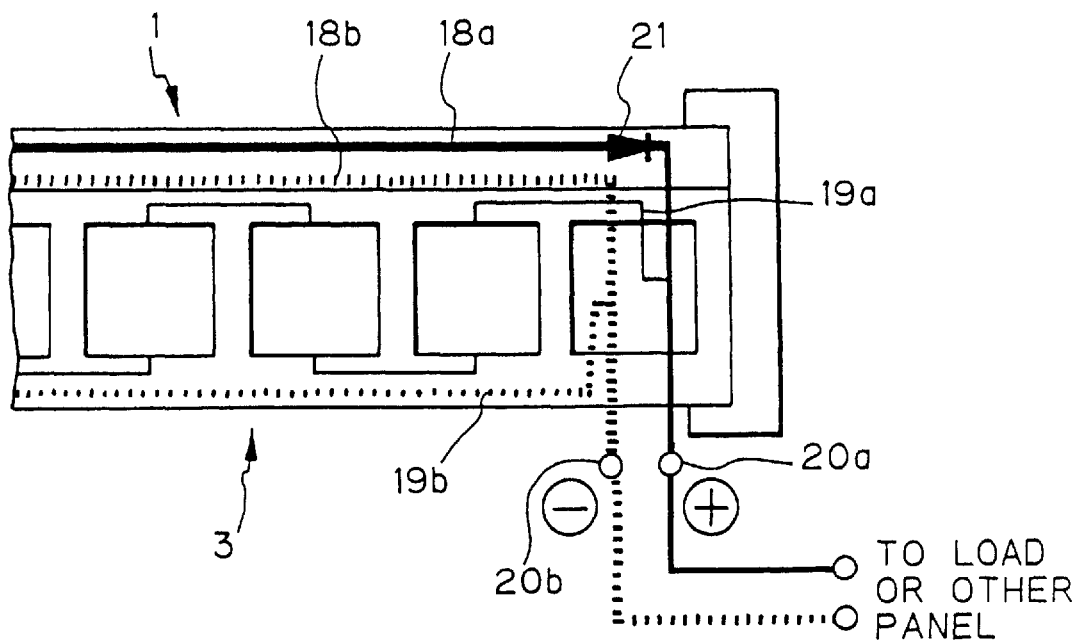
FIG. 4 is a typical electric circuit diagram of the embodiment shown in FIG. 1 or 2.

By referring to FIG. 4, it will next be explained an electrical connection in the embodiments. As described above, in the embodiments, a certain number of solar cells are connected in series so as to provide substantially the same open-circuit voltage, and then the serial connection branches are connected to each other in parallel. Positive and negative output lines 18a, 18b of the solar cell section 1 are respectively connected to positive and negative input/output lines 19a, 19b of the storage battery section 3, and they are then connected to positive and negative output terminals 20a, 20b for external connection which may be positioned in the extra space(s) 17. The lines 18a, 18b, 19a, 19b are extending inside the device. Accordingly, only one pair of output terminals is employed in the embodiments.

A reverse flow preventing diode 21 is disposed along one of the lines 18a, 18b prior to the connection of the lines 18a, 18b with the lines 19a or 19b to prevent the solar cells 2 from being damaged due to the influence of an electric circuit comprising a load and the storage battery section 3. In FIG. 4, a simple electrical connection for maintenance-free application is shown, but means for controlling charging and discharging may be provided in accordance with the application.

Since as is apparent from FIGS. 1 and 2, the device according to the present invention has the same shape as a prior solar cell panel, provided for power generation in the same way. During periods of sunlight, in the present invention, electrical power generated by the solar cell section 1 that exceeds power consumption at a load is charged to the storage battery section 3. That is, the following reaction takes place in the redox battery cells 4 and power charging is effected:

Positive electrode: 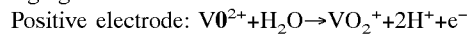
V of "$VO_2^+$" is pentavalent V of "$VO^{2+}$" is quadrivalent Negative electrode: 
V of "$V^{2+}$" is divalent and V of "$V^{3+}$" is trivalent.

Power supply required at night or during rainy or cloudy conditions is provided from the redox battery cells 4 by means of a reaction of the redox battery cells reverse to the above reaction.

Therefore, since the device of the present invention incorporates the storage battery section as well as the solar cell section, it is less susceptible to weather variation in comparison to a conventional solar cell panel, and thus is suitable for use where no conventional main power supply is available. Accordingly, the device according to the present invention is useful for an agricultural greenhouse to reduce costs thereof, and for an electrical power source in a remote place.

In addition, in the device of the present invention, since the redox battery cells are used as a storage battery, no substantial variation in voltage among the redox battery cells is caused and thus a substantially constant voltage is obtained across the serial branches of the cell. Further, if substantial voltage variation occurs, such variation can be easily corrected flow of electrolytic solution through the electrolyte exchange holes.

Furthermore, since electrical energy is stored in the form of an electrolyte, high flexibility in the shape of the device can be provided to satisfy any type of application. In addition, the solar cell section overlaps the storage battery section to form a plate to save space.

It should be further understood by those skilled in the art that forgoing descriptions are preferred embodiments of the disclosed device and that various changes and modifications may be made in the present invention without departing from the spirit and scope thereof. For instance, the redox battery cells can be arranged in more than two rows, if necessary.

What is claimed is:

1. A device containing a solar cell panel and a storage battery comprising:
   a solar cell section having a plate form and comprising one or more solar cells which generate electrical power when they receive light; and
   a storage battery section lying under the solar cell section, comprising one or more storage battery cells,
   wherein each of said storage battery cells comprises a first chamber containing a first electrolytic solution, a second chamber containing a second electrolytic solution and a membrane dividing said first and second chambers, whereby ions solved in said first and second electrolyte solutions undergo a change in valences, while maintaining their status as solved ions; and
   wherein said storage battery section further comprises a first group of fluid paths each connecting two adjacent first chambers to each other to communicate said first solution, and a second group of fluid paths each connecting two adjacent second chambers to each other to communicate said second solution.

2. A device as set forth in claim 1, wherein said device is formed in a plate as a whole.

3. A device as set forth in claim 1, further comprising an electric circuit for charging electrical power generated by said solar cell section in said storage battery section and for providing electrical power to output terminals of said device.

4. A device as set forth in claim 3, wherein said electric circuit includes first and second pairs of lines formed inside said device, said first pair of lines are connected to provide the electrical power from said solar cell section to said output terminals, and said second pair of lines are connected to charge the electrical power from said solar cell section to said storage battery section and to provide the charged electrical power to said output terminals.

5. A device as set forth in claim 4, wherein said first and second pairs of lines are connected to each other prior connecting to said output terminals, and said electric circuit further includes a diode for preventing a reverse current flowing through said first pair of lines, which is imposed in one of lines of said first pair.

6. A device as set forth in claim 1, wherein said first solution is a hydrochloric acid solution containing iron ions solved therein and said second solution is a hydrochloric acid solution containing chrome ions solved therein, and thereby the valences of said iron ions and chrome ions are changed, as charging or discharging is performed in said storage battery section.

7. A device as set forth in claim 1, wherein said first and second solutions are sulfuric acid solutions containing vanadium ions solved therein, and thereby the valences of vanadium ions are changed, as charging or discharging is performed in said storage battery section.

8. A device as set forth in claim 1, wherein said solar cells are connected such that they are connected in series for several ones to form serial branches providing substantially the same voltage and said serial branches are connected in parallel, and the number of said solar cells of each of said serial branches is selected so that the voltage provided by said serial branches is substantially the same as that of said storage battery section.

9. A device as set forth in claim 1, wherein said storage battery section comprises a multiplicity of layers of storage battery cells.

10. A device containing a solar cell panel and a storage battery comprising:

a solar cell section having a plate form and comprising one or more solar cells which generate electrical power when they receive light; and a storage battery section lying under the solar cell section, comprising one or more storage battery cells, wherein each of said storage battery cells comprises a first chamber containing a first electrolytic solution, a second chamber containing a second electrolytic solution and a membrane dividing said first and second chambers, whereby ions solved in said first and second electrolyte solutions undergo a change in valences, while maintaining their status as solved ions, wherein said member from each of said storage battery cells are formed as a single common membrane.

11. A device containing a solar cell panel and a storage battery comprising:

a solar cell section having a plate form and comprising one or more solar cells which generate electrical power when they receive light; and a storage battery section lying under the solar cell section, comprising one or more storage battery cells, wherein each of said storage battery cells comprises a first chamber containing a first electrolytic solution, a second chamber containing a second electrolytic solution and a membrane dividing said first and second chambers, whereby ions solved in said first and second electrolyte solutions undergo a change in valences, while maintaining their status as solved ions, the device further comprising a protection frame for protecting said storage battery section, a space located at an end portion of said protection frame, and through holes connecting said space to said first and second chambers to inject said first and second electrolytic solution in said first and second chambers respectively.

12. A device as set forth in claim 11 further comprising means installed in said space for circulating said first and second electrolytic solutions through said first and second chambers.

13. A device as set forth in claim 12, wherein said first and second chambers are divided by bulkheads each having at least a throughhole for flowing said first or second electrolytic solution between the adjacent first and second chambers, said throughholes of said bulkheads being in alternate positions, thereby preventing the stagnation of the electrolytic solution.

* * * * *